Patented Sept. 26, 1922.

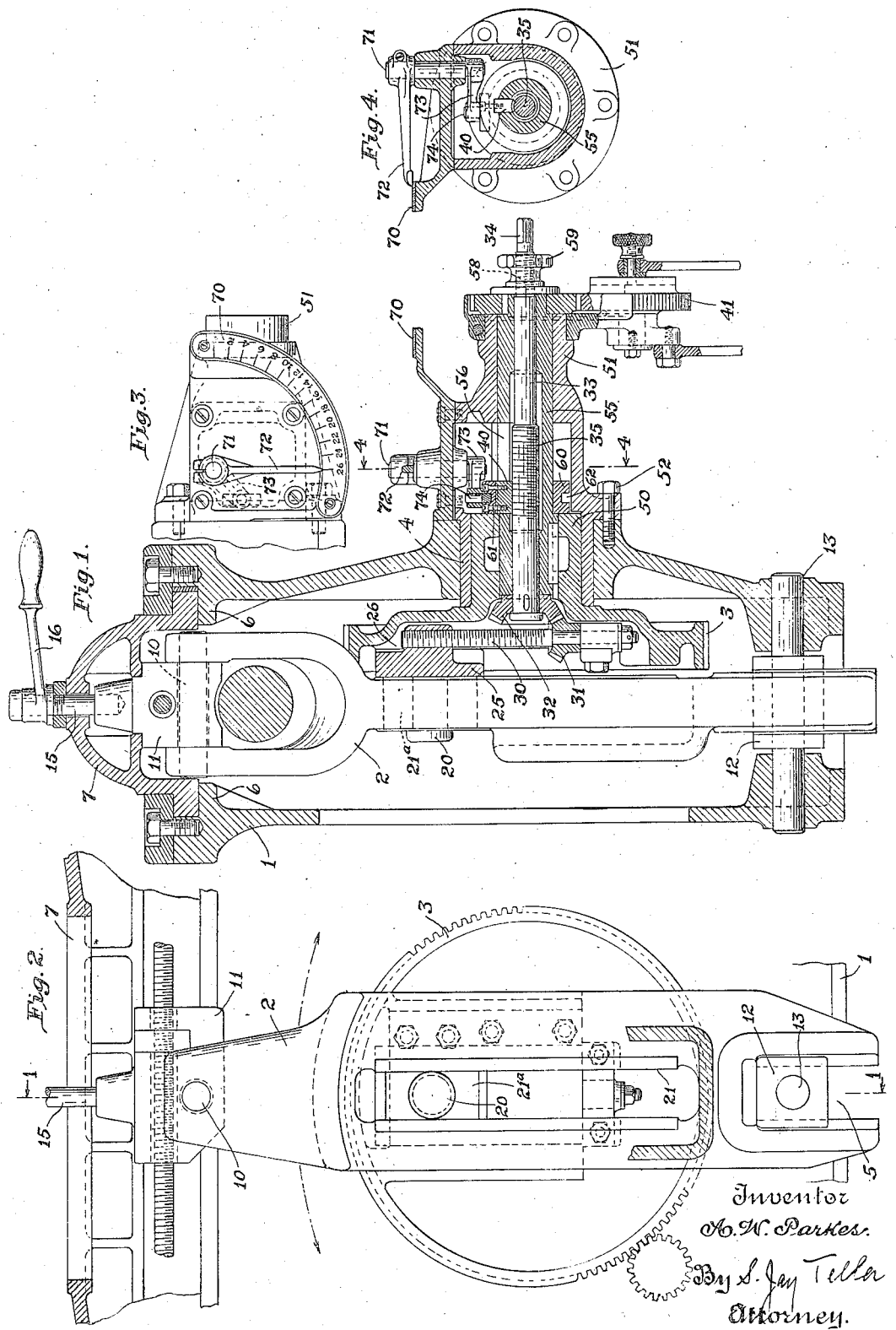

1,430,180

UNITED STATES PATENT OFFICE.

ALBERT W. PARKES, OF DUNDAS, ONTARIO, CANADA, ASSIGNOR TO NILES-BEMENT-POND COMPANY, OF NEW YORK, N. Y., A CORPORATION OF NEW JERSEY.

METAL SHAPER.

Application filed June 10, 1920. Serial No. 387,935.

*To all whom it may concern:*

Be it known that I, ALBERT W. PARKES, a subject of the King of Great Britain, residing at Dundas, in the Province of Ontario and Dominion of Canada, have invented certain new and useful Improvements in Metal Shapers, of which the following is a specification.

This invention relates to metal shapers and in particular to a shaper of the oscillating link type. More especially, the invention relates to an indicating means on a shaper of the above type to indicate to the operator exactly the length of stroke for which the shaper ram is adjusted.

An object of the present invention is to provide a conveniently mounted indicator mounted on the frame of the shaper which will indicate to the operator the length of stroke of the ram for which the shaper is adjusted.

A further object of the invention is to provide an indicator attached to and moved by the means for adjusting the stroke of the shaper so that as the stroke of the shaper is changed the indicator pointer moves simultaneously to indicate the stroke to which the shaper ram has been newly adjusted.

Another object of the invention is to provide an indicator in the form of a dial and pointer which will be visible always to the operator and will be set accurately to correspond with the stroke for which the shaper ram is adjusted.

In the accompanying drawings I have shown an embodiment of the invention which I now deem preferable, but it is to be understood that changes and modifications may be made within the scope of the appended claims without departing from the spirit of the invention.

In the accompanying drawings annexed hereto and forming a part of this specification:

Figure 1 shows an elevation in section taken along the line 1—1 of Fig. 2.

Fig. 2 is a fragmentary side elevation of the operative part of the shaper, the side of the shaper frame being broken away.

Fig. 3 is a detail of the indicator dial and pointer shown in plan.

Fig. 4 is a cross sectional view in elevation of the indicator and operating means taken on line 4—4 of Fig. 1.

As illustrated in the above mentioned drawings, the embodiment of the invention selected for illustration in its entirety comprises the following principal parts; namely, first, a horizontally mounted ram. second. operating means for reciprocating the ram. third, means for adjusting the stroke of the ram, fourth, a follower mounted on the adjusting means, fifth, an indicator comprising a dial and pointer, and sixth, means operatively connecting the indicator pointer and the follower.

Referring to the figures of the drawing more in detail, the base or frame of the shaper is shown at 1 within which is adapted to oscillate a substantially vertical link 2. In order to oscillate this link 2 a gear 3 is provided suitably mounted in a bearing 4 to be more fully described later provided in the base 1 and adapted to be rotated by any convenient means such as a train of gears connected to a motor or belt pulley. Horizontally slidable in suitable ways 6, provided in the upper portion of the base 1, is a ram 7. This ram is pivotally attached to the upper end of the link 2 by means of a cross pin 10.

Link 2 at its lower end is provided with a slot 5 which is adapted to provide a guide way for bearings 12 which in turn are fitted about the pin 13 which is fixedly secured to the shaper frame. By this means the link 2 is adapted to oscillate freely in accordance with movement imparted to it by the crank pin on gear 3 to be referred to later.

Preferably the cross pin 10 is mounted in a suitable adjusting block such as shown at 11 which may be clamped rigidly to the ram 7 in any adjusted position by means of a screw 15 and handle 16. As the parts of the ram 7 and the means for oscillating the link form no part of the present invention, they will not be further explained. The invention is, however, not restricted to a shaper of the above indicated type but may be applied to any shaper or similar tool having rotatable means for varying the stroke of a tool or work carrying member.

It will be seen from the above brief description that by rotation of the gear 3 and by means of a crank pin 20 working bearing 21ª sliding in a vertical guideway 21 in the link 2, means are provided for oscillating the link 2 and reciprocating the ram 7. In order to vary the throw of the link and ram it is therefore only necessary to adjust the position of the crank pin 20 toward or from the axis about which the gear 3 rotates.

This adjustment of the crank pin 20 is accomplished by the following mechanism: The crank pin 20 is mounted in a cross head or block 25 which slides within suitable ways 26 provided along one of the diameters of the driving gear 3. Within this guideway 26 of the driving gear 3 is mounted a screw threaded shaft 30 in threaded engagement with an extension on the block 25. It will thus be seen that rotation of the screw shaft 30 will vary the position of the crank pin 20 along the guideways 26, and thus increase or decrease the distance of the crank pin 20 from the axis of the driving gear 3. This variation in the distance of the crank pin 20 from the axis of rotation of the gear 3 serves to vary the stroke of the ram 7.

In order to rotate this screw shaft 30 a bevel gear 31 is mounted on the shaft 30 near one end meshing with a corresponding bevel gear 32 mounted on the same axis as the gear 3. Gear 32 is keyed or otherwise suitably fastened to a horizontal shaft 33 extending completely through the machine and at its outer end is provided with suitable wrench-engaging parts 34. Provided on the shaft 33 is a threaded portion 35. Pressing against the threaded portion 35 of the shaft 33 is a follower 40 which is provided on one of its edges with thread engaging projections. It will thus be seen that rotation of the shaft 33 to adjust the position of the crank pin 20 serves to move the follower 40 either to the left or right along shaft 33.

In order to form a rigid bearing 4 for the driving gear 3, this member is provided with an extension 50 at one side which is of cylindrical form. This projection 50 is rotatably fitted within an extension to a support or bracket member 51 rigidly secured to the side frame of the shaper 1 by means of studs or bolts 52. Rotatably held within the support 51 is a hollow bushing or sleeve 55, which extends the entire distance of the support or bracket member 51 and passes through the projection 50 formed on the gear 3. About midway of its length this bushing or sleeve 55 is provided with a longitudinal slot 56.

Within the bushing or sleeve 55, the threaded shaft 33 is rotatably secured in suitable bearings at or near its ends. This shaft 33 extends the entire length of the bushing 55 and at its outer end may be provided with a threaded section 58 and lock nut 59 in order that it may be rigidly clamped and thus fastened to the bushing 55. If desired, suitable feed mechanism 41 for controlling movements of the work carriage may be mounted upon the outer end of the bushing 55 and operated by the rotary movement of the bushing or sleeve 55 through suitable gearing.

Surrounding the bushing 55 is a collar 60 which is attached to the follower 40 previously mentioned by means of cap screws 61. The outer circumference of the collar 60 is grooved as shown at 62 and provides a suitable positioning means for the indicator pointer presently to be described. From this construction it will be seen that as the driving gear 3 is rotated during the operation of the shaper, the bushing 55 and the shaft 33 will also be rotated which in turn will simultaneously rotate the collar 60.

In order to adjust the stroke of the ram 7 of the shaper, which is accomplished by varying the location of the crank pin 20, it is necessary merely to loosen the lock nut 59 and rotate the shaft 33 relative to the bushing 55. The follower 40 is thus caused to move along the threaded portion 35 of the shaft 33 and thus serves to move the collar 60 longitudinally along the bushing 55, the movement of the collar 60 being of course proportional to the rotation of shaft 33.

Conveniently mounted on the bracket or support member 51 and preferably on its upper surface is a dial plate 70 preferably arc shaped which at its periphery is provided with graduations indicating the length of stroke for which the ram may be set. At the center of the dial plate is a vertical pivoted member 71 to which the indicator pointer 72 is attached. As shown in Fig. 3 the pointer 72 passes directly over the graduations of the dial and in doing so passes through about a quadrant of a circle. Below the dial plate 70 and within the support or bracket member 51, an arm 73 is attached by any suitable means to the pivot member 71. This arm 73 is preferably provided at its outer end with a pin or stud 74 engaging the groove 62 provided in the collar 60.

It will thus be seen that in the construction as above described, when the follower 40 is moved along the screw threaded portions 35 of the shaft 33, which occurs only when the stroke of the ram is varied or adjusted, the pivot 71 is rotated and the position of the pointer varied in accordance with the different positions of the follower 40 on the screw threaded portion 35 of the shaft 33.

From the above it will be seen that a convenient indicator has been provided always in view of the operator and always set to indicate the stroke of the ram for which the shaper is adjusted. Furthermore no additional movement of the operator is required to operate the indicator as the indicator is automatically varied in accordance with variations in adjustment of the stroke of the ram.

What I claim is:

1. In a shaper having a ram and an oscillating link, an adjustably mounted crank pin to vary the stroke of said link and ram, means for adjusting the position of said crank pin, an indicator dial, a pointer movable over said dial, a screw threaded portion on said crank pin adjusting means, and means engaging said screw thread to position said pointer whereby the position of the pointer relative to said dial indicates the stroke for which the shaper is adjusted.

2. In a shaper having a ram and an oscillating link, an adjustably mounted crank pin to vary the stroke of said link and ram, means for adjusting the position of said crank pin, a pivotally mounted pointer, and means comprising a threaded portion on said adjusting means and a follower mounted on said threaded portion whereby the position of said pointer indicates the position of said crank pin and therefore the stroke for which said ram is adjusted.

3. In a shaper having a ram and an oscillating link, an adjustably mounted crank pin to vary the stroke of said link and ram, means for adjusting the position of said crank pin, a pointer, a screw threaded portion on said crank pin adjusting means, and means comprising a pivoted lever and means engaging said screw thread to position said pointer whereby the position of the pointer relative to a dial indicates the stroke for which the shaper is adjusted.

4. A stroke indicator for shapers comprising in combination, a dial, a pivoted pointer movable over said dial, a stroke adjusting device, a threaded member thereon, means comprising a screw thread engaging member connecting said pointer with said threaded member on said stroke adjusting device, whereby when the stroke of the shaper is adjusted by rotation of said threaded member, the pointer will be positioned relative to the dial thus indicating the stroke for which the shaper is adjusted.

5. A stroke indicator for shapers comprising in combination, an arc shaped dial, a pivotally mounted pointer movable over said dial, a stroke adjusting device, a threaded member thereon, means comprising a screw thread engaging member connecting said pointer with said threaded member on said stroke adjusting mechanism, whereby when the stroke of the shaper is adjusted by rotation of said threaded member, the pointer will be positioned relative to the dial thus indicating the stroke for which the shaper is adjusted.

6. A stroke indicator for shapers comprising in combination, a dial, a pointer movable over said dial, a stroke adjusting shaft having an intermediate threaded portion, a screw thread engaging member mounted on said threaded portion of said stroke adjusting shaft, a collar slidably mounted in alignment with said shaft, said collar and thread engaging member being connected to slide together, pivoted means engaging said collar, and connections between said pivoted member and pointer whereby said pointer indicates the position of the stroke adjusting mechanism.

7. A stroke indicator for shapers comprising in combination, a dial, a pointer movable over said dial, a stroke adjusting shaft, a screw thread engaging member mounted on a threaded portion of the stroke adjusting shaft, a sleeve surrounding said adjusting shaft, having a longitudinal slot therein, a collar mounted on said sleeve and connected to said thread engaging member whereby said collar will move longitudinally on said sleeve when said adjusting shaft is rotated, and means connecting said collar and pointer whereby the slidable movement of said collar will serve to vary the position of said pointer and indicate the stroke for which the shaper is adjusted.

In testimony whereof, I hereto affix my signature.

ALBERT W. PARKES.

Witnesses:
J. IRWIN,
W. J. HOUGHTLING.